Aug. 11, 1931.  W. HOLMAN  1,818,060
WAREHOUSE TRUCK
Filed Sept. 1, 1928
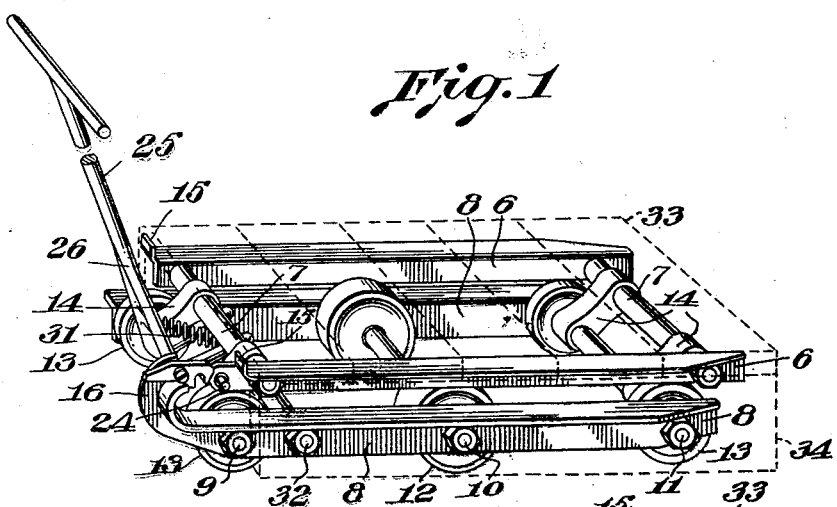
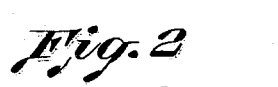
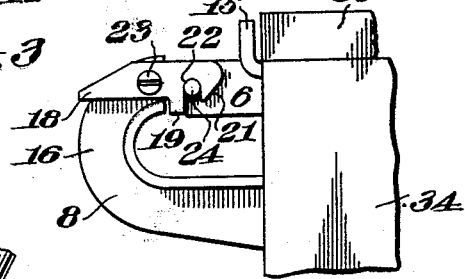
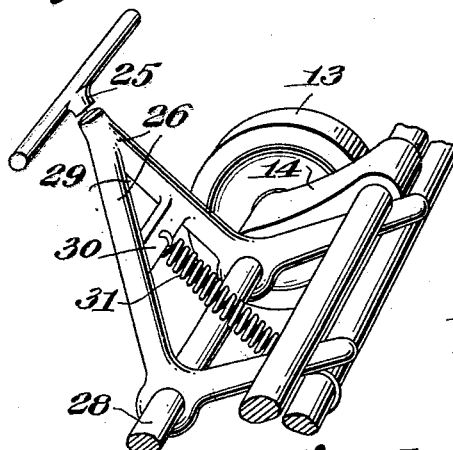
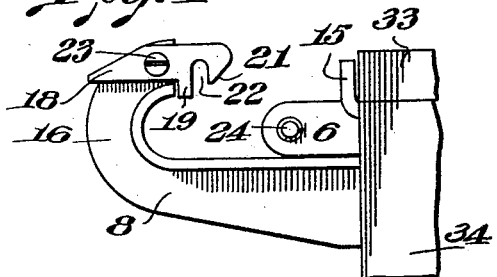
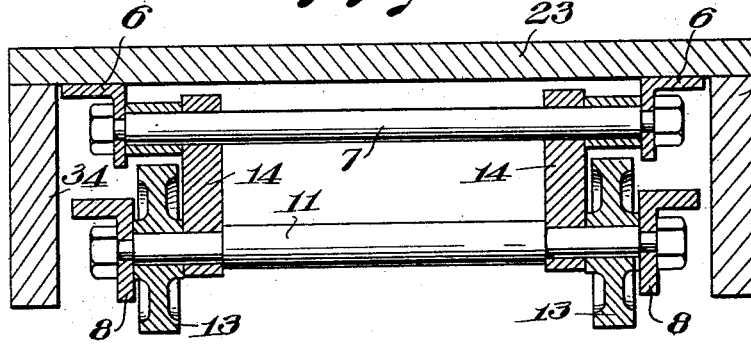

Patented Aug. 11, 1931

1,818,060

UNITED STATES PATENT OFFICE

WILLIAM HOLMAN, OF MANLY, NEAR SYDNEY, NEW SOUTH WALES, AUSTRALIA

WAREHOUSE TRUCK

Application filed September 1, 1928, Serial No. 303,581, and in Australia October 25, 1927.

This invention relates to trucks generally hand trucks as used in warehouses and stores for removing goods and for such like purposes which trucks are used with a stool or platform normally resting on the ground (or floor or other supports hereinafter included in the term ground) and capable of receiving under it such truck. And these improvements have been specially devised first to simplify the construction of those connections which hold the lifting frame part of the truck in elevated position and to dispense with much of such connecting mechanism at a very considerable increase of easy and certain manipulation of the truck and very considerable decrease of construction cost and secondly to simplify the method and provide mechanism therefor of veering the truck in its journeys whereby maximum change of direction even of turning in its own length is available and this at less first cost of construction and with easier manipulation.

An improved lifting and pivoting truck constructed according to these improvements (apart from its deck or platform) comprises a rectangular double frame or chassis on three pairs of running wheels one pair medially of slightly larger diameter than the pairs at each end which latter are on axles which form the transverse end members of the underframe. At each end of the truck are parallel motion links pivoted to the axle of the wheels and to the transverse end member of the upperframe of the chassis and which allow the upperframe to rest on the lower one and to be raised therefrom. A truck pole with a draw handle has its lower end bifurcated and angularly inset and has bearings at the angles for taking on the front end axle while the fork angled extensions are adapted to take under the front transverse member of the upperframe. On an extension of or on the lowerframe longitudinal at front is pivoted an overbalanced lever latch which has a hook on the heavy end adapted to catch a pin on the upperframe longitudinal and hold both said longitudinals locked together with the upperframe in elevated position. From a front cross member of the underframe of the chassis to the draw pole is a helical spring adapted to normally press the angular extended bifurcations against said cross member and hold said pole nearly upright.

But in order that this invention may be readily carried into effect one practical embodiment of these improvements in a truck will now be described with reference to the drawings (which are more or less schematic) accompanying and forming part of this complete specification wherein Fig. 1 is a perspective elevation of present improved truck with a deck or platform therefor indicated by dotted lines. Fig. 2 is a fragmentary view of the bifurcated draw pole and forward transverse members of the chassis Figs. 3 and 4 show the fore end of the chassis with upperframe in raised and lowered position respectively and Fig. 5 is a transverse sectional view of the truck with a suitable platform and hood.

The chassis sides comprise upper longitudinals 6 and lower ones say of angle iron or steel the former having end members or transversals 7 and the latter having a medial axle 10 and end axles 9 and 11 upon which are loosely mounted medial and end wheels 12 and 13. For connecting the upper chassis longitudinals 6 with the lower chassis longitudinals 8 are loose inclined parallel motion links 14 reaching from transversals 7 to axles 9 and 11 respectively. A longitudinal 6 (or both of them) has its forward end bent up to form stops 15 while the forward end of a longitudinal 8 (or of both of them) has semicircular extension 16 carrying a rotatable latch with stops 18 and 19 and with a tapered striking edge 21 and a catch slot 22 and which has a screwed-in pivot 23. Complementarily to the latch is a catch pin or pintle 24 fixed to the extended fore end of the longitudinal 6. The truck draw-pole 25 with ordinary handle has its lower end bifurcated to form limbs 26 bent at approximately right angles to form extended lifters 27 which extend under and beyond the forward end member 7. Each limb at its angle has bearing orifice 28 by which the pole 25 is pivotally carried on the front axle 9 medially of the links 14. Near the angular divergence of the limbs 29 is an anchor or cross bar 30 to which is hooked a helical tension spring 31 whose lower end is affixed to an extra lowerframe transversal or forward cross bar 32 and which spring keeps the draw pole 25 resiliently nearly upright with its lifters 27 resting or pressing on said bar 32.

A stool or platform 33 of ordinary construction with sides 34 forming legs or nests fits over the truck chassis and when the upper longitudinals 6 are elevated rests upon these with the sides clear of the ground.

When the upperframe 6—7 is resting on the lowerframe 8 in idle position of the chassis the draw pole 25 is vertical or nearly so and the truck is capable of being wheeled (and being halted in position by stops 15) under the deck or platform 33—34 resting on the ground and on which may be the loading. The pole 25 is then used as a press-down lever causing the lifters 27 under the crossframe 7 to rise and by means of parallel motion links 14 to lift the upperframe 6—7 (with the loaded platform 33—34) to near the limit allowed by said links 14. Now the stub pintle 24 catching on the striking edge 21 raises it and slips within the catch slot 22 (and if the pawl does not directly fall over said pintle pushes or strikes against stop 19 and briefly closes catch 22 on said pintle) and so the upperframe 6—7 and platform 33—34 and its loading will be held on the truck in elevated position clear of the ground all ready for a journey.

To veer the truck in its course the larger medial wheels 12 are caused by manipulation of the pole to hold the weight of the load and truck in balance or somewhat balanced so that either the front or the rear pair of wheels 13 can with ease by transverse pressure against said pole 25 be thrust slidingly sideways to an unlimited extent effecting veering or change of direction of truck in comparatively very little length and/or space.

On reaching destination the tail or stop 18 of the holding pawl is depressed to release the pintle 24 and the upperframe 6—7 is gently lowered while its descent is controlled through the draw pole 25 which may be held against sudden motion until the upper longitudinals 6 rests upon the lower frame 8, the stool or platform sides 34 reaching the ground supports the load and the pole 25 is then allowed to be held in rest on the cross bar 32 by spring 31.

What I claim as my invention and desire to secure by Letters Patent is:—

1. A lifting truck comprising an under frame including forward and rear transverse axles, wheels mounted upon said axles, longitudinal side frame members mounted on said axles adjacent said wheels, the longitudinal frame members being formed from angle irons and being bent arcuate in shape at the forward end thereof, an upper frame, links uniting said under and upper frames, a pin on the forward end of said upper frame, and a latch on the arcuate portion of the longitudinal members of said under frame adapted to engage the pin on said upper frame in the elevated position of the upper frame.

2. A lifting truck comprising an under frame including forward and rear transverse axles, wheels rotatably mounted upon said axles, longitudinal side frame members secured to said axles, the longitudinal frame members of angle irons and being bent upwardly to form an arcuate extension at the forward end thereof, an upper frame including forward and rear transverse members, longitudinal frame members secured to said transverse members and having forward extensions thereon, parallel motion links connecting said upper and under frames, means for raising said upper frame, a latch pivoted on the curved extension of the longitudinal frame members of said under frame, and a pin secured to the extensions on said longitudinal frame members of said upper frame, said latch being adapted to engage said pin in the lifted position of said upper frame.

In testimony whereof I have signed my name to this specification.

WILLIAM HOLMAN.